(12) United States Patent
Gerard et al.

(10) Patent No.: US 9,032,455 B2
(45) Date of Patent: May 12, 2015

(54) METHOD OF MANAGEMENT OF TRICK MODE COMMANDS DESTINED TO CONTROL A DIGITAL CONTENT STREAMING SERVER

(75) Inventors: François Gerard, Beignon (FR); Denis Mischler, Thorigne Fouillard (FR); Jean-Baptiste Henry, Melesse (FR)

(73) Assignee: Thomson Licensing, Issy-les-Moulineaux (FR)

( * ) Notice: Subject to any disclaimer, the term of this patent is extended or adjusted under 35 U.S.C. 154(b) by 748 days.

(21) Appl. No.: 12/589,718

(22) Filed: Oct. 27, 2009

(65) Prior Publication Data

US 2010/0122302 A1 May 13, 2010

(30) Foreign Application Priority Data

Oct. 27, 2008 (EP) .................................. 08305739

(51) Int. Cl.
*H04N 7/173* (2011.01)
*H04N 21/2387* (2011.01)
*H04N 21/239* (2011.01)
*H04N 21/258* (2011.01)
*H04N 21/472* (2011.01)
*H04N 21/6587* (2011.01)

(52) U.S. Cl.
CPC ....... *H04N 7/17336* (2013.01); *H04N 21/2387* (2013.01); *H04N 21/2396* (2013.01); *H04N 21/25866* (2013.01); *H04N 21/47202* (2013.01); *H04N 21/6587* (2013.01)

(58) Field of Classification Search
None
See application file for complete search history.

(56) References Cited

U.S. PATENT DOCUMENTS 6,237,035 B1 5/2001 Himmel
6,920,489 B1 7/2005 Yamamoto
(Continued)

FOREIGN PATENT DOCUMENTS

CN 1968409 5/2007
JP 09130779 7/1996
(Continued)

OTHER PUBLICATIONS

European Search Report dated Mar. 16, 2009.
Schulzrinne, H., "Real time streaming protocol". Network working group. Request for comments 2326. Category standards tracks, Apr. 1998, pp. 1-92.
Yeganeh et al., "NGN functional architecture for resource allocation and admission control", International journal of Hybrid Information Technology, vol. 2, N° 3, Jul. 2009, pp. 11-34.

(Continued)

*Primary Examiner* — Cai Chen
(74) *Attorney, Agent, or Firm* — Myers Wolin LLC (57) ABSTRACT

The invention relates to a method of management of trick mode commands destined to control a digital content streaming server. In order to manage the transmission of trick mode commands from multiple trick mode command issuers, the method comprises:
a step of reception of at least one trick mode command from at least one command issuer,
a step of determination of elapsed time between the received command and a last transmitted command, and
a step of transmission of the received command to the at least a digital content streaming server if none of determined conditions applies, whereby the determined conditions comprises: if the elapsed time is smaller than a determined first delay; and if the command issuer of the received command does not have highest issuer rights allowing the issuer to derogate from respecting of the determined first delay.

18 Claims, 4 Drawing Sheets

(56) References Cited

U.S. PATENT DOCUMENTS

| | | |
|---|---|---|
| 7,246,367 B2 * | 7/2007 | Iivonen .................. 725/102 |
| 2003/0287995 | 10/2003 | Fok |
| 2006/0028432 A1 | 2/2006 | Kawakami |
| 2007/0235742 A1 * | 10/2007 | Tobise et al. .................. 257/79 |
| 2008/0235742 A1 * | 9/2008 | Osaki et al. .................. 725/100 |
| 2009/0265743 A1 * | 10/2009 | Gao .................. 725/94 |

FOREIGN PATENT DOCUMENTS

| | | |
|---|---|---|
| JP | 2005269359 A2 | 9/2005 |
| JP | 2008010945 A2 | 1/2008 |
| WO | WO03/067594 | 8/2003 |

OTHER PUBLICATIONS

ETSI ES 282 001 V2.0.0, "Telecommunications and Internet converged Services and Protocols for Advanced Networking (TISPAN): NGN functional architecture", Mar. 2008, pp. 1-34.

ETSI TS 182 027 V2.0.0, "Telecommunications and Internet converged Services and Protocols for Advanced Networking (TISPAN): IPTV Architecture IPTV functions supported by the IMS subsystem", Feb. 2008, pp. 1-57.

ETSI TS 182 012 V2.1.4, "Telecommunications and Internet converged Services and Protocols for Advanced Networking (TISPAN): IMS based PSTN ISND emulation sub system (PES)", Functional architecture, Mar. 2008, pp. 1-29.

* cited by examiner

METHOD OF MANAGEMENT OF TRICK MODE COMMANDS DESTINED TO CONTROL A DIGITAL CONTENT STREAMING SERVER

This application claims the benefit, under 35 U.S.C. §119 of European Patent Application No. 08305739.8, filed Oct. 27, 2008.

1. FIELD OF INVENTION

The invention relates to the field the management of trick mode commands destined to a digital content streaming server. More specifically, the invention relates to managing trick mode commands received from multiple digital content stream receivers.

A digital content stream comprises an audio only, a video only, and a video stream comprising audio, as well as multimedia streams, comprising video with or without audio and audio streams, destined to be recorded and played back.

2. TECHNICAL BACKGROUND

According to prior art, a digital content stream, such as an audio or a video stream possibly comprising audio, delivered to a receiver in the context of content-on-demand such as video-on-demand (VoD) is delivered through a one-to-one connection with a VoD server, for example by using IP (Internet Protocol) unicast distribution. This one-to-one distribution model is opposed to a one-to-many distribution model, where a same content source is received at the same time by many receivers.

The one-to-one distribution model allows a receiver to intervene on the unrolling of the content by issuing so-called trick mode commands. Trick mode commands comprise actions such as play, stop, pause, fast reverse, fast forward and go to chapter. In this distribution model, it is the receiver that commands the streaming of a content stream through a one-to-one connection with a content streaming server. While this distribution model allows trick mode commands, the model does not allow more than one receiver to receive the same content stream and allow more than one receiver to issue trick mode commands on the same stream.

In the one-to-many distribution model, it is the distribution server that commands the streaming. The one-to-many distribution model is used to distribute a same content stream to a large audience, for example to distribute TV or radio programs. With this distribution model, trick mode commands are not allowed, or only allowed for one receiver.

The above described distribution models are convenient for Video-on-Demand applications and television or radio broadcasting. However, the above described distribution models do not allow combining a one-to-many distribution with the support of trick mode commands from several receivers.

One of the problems that need to be solved when trick mode commands from several receivers are to be supported in a one-to-many stream distribution model is the management of the flow of trick mode commands that the streaming server must handle.

According to prior art, rendering of a content over multiple receivers with support of trick mode commands is applied in the context of, for example, e-learning applications, where students each have a receiver and can issue trick mode commands to intervene on the unrolling of a course. According to prior art, the course is distributed through prior downloading of the course content on the receiver of each student, and each student can issue trick mode commands. However, current state of the art does not allow management for handling the flow of trick mode commands.

3. SUMMARY OF THE INVENTION

The present invention aims at alleviating the inconveniences of prior art.

In particular, the objective of the present invention is to allow a one-to-many digital content stream distribution with support of trick modes for many stream receivers.

The invention relates more particularly to a method of management of trick mode commands destined to control at least a digital content streaming server, comprising the following steps:
  reception of at least one trick mode command from at least one command issuer, called received command;
  determination of elapsed time between the received command and a last transmitted command;
  transmission of the received command to the at least a digital content streaming server if none of determined conditions applies, the determined conditions comprising:
    the elapsed time is smaller than a determined first delay; and
    the command issuer of the received command does not have highest issuer rights allowing the issuer to derogate from respecting of the determined first delay.

According to a particular embodiment of the invention, the method comprises a step of determination of the first delay according to an estimation of a delay needed to allow all of the at least one command issuer to render a result of the command.

According to a particular embodiment of the invention, the determined conditions further comprises:
  a determined second delay is not respected between the transmission of a last transmitted command received from a first command issuer, and the reception of a second command from a second distinct command issuer, and
  the second command issuer does not have highest issuer rights allowing the second command issuer to derogate from respecting of the determined second delay.

According to a particular embodiment of the invention, the method comprises a step of determination of the second delay according to a minimal delay counted from the transmission time of a command before a command from another command issuer is transmitted if none of the determined conditions applies.

According to a particular embodiment of the invention, the method comprises attributing a highest level of issuer rights to a command issuer that initiated a streaming session.

According to a particular embodiment of the invention, the command issuer rights for transmission of the second command comprise a limitation on a type of trick mode commands that are transmitted to the digital streaming server under respect of the determined conditions.

According to a particular embodiment of the invention, the determined conditions further comprises:
  the received command is of a same determined type as an already transmitted command.

According to a particular embodiment of the invention, the digital content stream is an audio stream.

According to a particular embodiment of the invention, the digital content stream is a video stream.

4. LIST OF FIGURES

More advantages of the invention will appear through the description of particular, non-restricting embodiments of the invention. The embodiments will be described with reference to the following figures:

FIG. 5 shows an algorithm of implementing the steps of the method of trick mode commands destined to control a digital content streaming server according to a particular embodiment of the invention, such as implemented by trick mode manager 4 of FIG. 4.

5. DETAILED DESCRIPTION OF THE INVENTION

Figure 1:
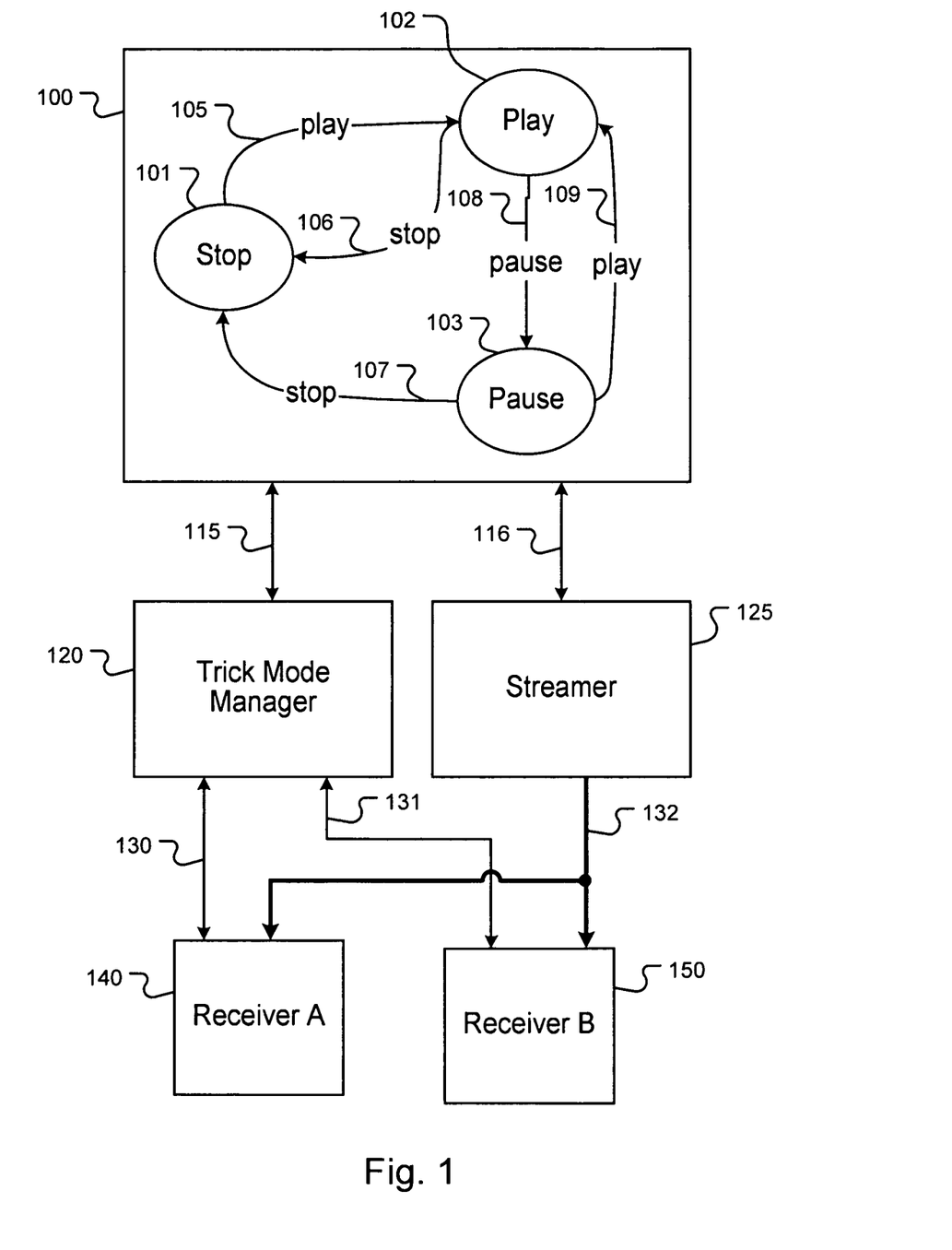
FIG. 1 shows an example network infrastructure that is compatible with the invention.

FIG. 1 shows an example network infrastructure that is compatible with the invention according to method of management of trick mode commands according to the invention The infrastructure comprises:
- a trick mode controller 100;
- a trick mode manager 120;
- a digital content streamer 125;
- a receiver A 140; and
- a receiver B 150;

The trick mode controller 100 comprises a state machine with:
- a state "stop" 101;
- a state "play" 102; and
- a state "pause" 103.

The state machine comprises state-to-state transitions:
- "play" 105, for state transition stop to play;
- "stop" 106, for state transition play to stop;
- "stop" 107, for state transition pause to stop;
- "pause" 108, for state transition play to pause; and
- "play" 109, for state transition pause to play.

Devices 100, 120, 125, 140 and 150 are interconnected by the following connections:
- connection 130, that connects receiver A 140 to trick mode manager 120;
- connection 132, that connects receiver A 140 to digital content streamer 125;
- connection 115, that connects trick mode manager 120 to trick mode controller 100;
- connection 131, that connects receiver B 150 to trick mode manager 120;
- connection 132, that connects receiver B 150 to streamer 125; and
- connection 116, that connects digital content streamer 125 to trick mode controller 100.

Receivers A 140 and B 150 both send trick mode commands over connections 130 respectively 131 to trick mode manager 120. Trick mode manager 120 transmits trick mode commands from receivers A 140 and B 150 to trick mode controller 100.

Trick mode controller 100 sends trick mode commands to digital content streamer 125 over connection 116.

Digital content streamer 125 sends a digital content stream to receivers A 140 and B 150 over connection 132.

The trick mode manager 120 receives trick mode commands from command issuers in receivers A 140 and B 150 over connections 130 and 131. According to the respect of certain conditions explained further on, these commands are transmitted to trick mode controller 100 over connection 115. Trick mode controller 100 comprises a state machine, and changes state according to received trick mode commands from trick mode manager 120. According to the new state that the trick mode controller enters, it sends a corresponding trick mode command to digital content streamer 125 over connection 116. Digital content streamer 125 in turn streams the content to receivers A 140 and B 150 over connection 132 as a function of the received trick mode command.

Trick mode manager 120 determines the time that elapses between the transmission of a last transmitted command and the reception of a trick mode command. The trick mode manager 120 transmits a received trick mode command to trick mode controller 100 under certain conditions. Notably, the trick mode command manager does not transmit a received command if the elapsed time between the received command and a last transmitted command is smaller than a determined delay; however, the command issuer of the received command can override this condition if he has highest issuer rights. This feature allows transmitting received commands only if a predetermined delay since a last transmitted command is respected, but the respect of the delay can be overridden if the command issuer has sufficient issuer rights. The feature thus allows spacing out the transmitting of received commands to the trick mode manager 120. Issuer rights determine the trick mode commands that the trick mode manager allows an issuer to be transmitted to the trick mode controller, with respect of the mentioned conditions.

The figure shows that a command issuer having highest issuer rights, is allowed to derogate from respecting of the first delay. For example, when in the "play" state, an initiator can send a "stop" command that will result in the state machine entering the "stop" state, whereas a non-initiator has to wait for the first delay to be elapsed before being able to make the state machine enter the "stop" state.

According to a particular embodiment of the invention, highest issuer rights are given to an initiator of a digital content streaming session. For example, highest issuer rights comprise all possible trick mode commands.

According to a particular embodiment of the invention, highest issuer rights comprise a subset of all possible trick mode commands. This is a suitable feature when the owner of a content stream does not wish that certain trick mode commands can have effect on the content streaming; for example, an owner of content only allows consumers of that content to be streamed by use of play and pause trick mode commands.

According to a particular embodiment of the invention, lowest issuer rights are given to an invitee of a digital content streaming session. For example lowest issuer rights comprise a subset of all possible trick mode commands such as pause. This feature allows restricting the rights of issuers other to limit their rights to transmit trick mode commands to a trick mode controller. Here, command issuer rights for transmission of said second command comprise a limitation on a type of trick mode commands that are transmitted to the digital streaming server under respect of the determined conditions.

According to a particular embodiment of the invention, issuer rights are not permanent during a streaming session, but can be revoked, or modified. This feature allows for example the adaptation of issuer rights to the unrolling of a streaming session according to issuer actions. For example, issuer rights of an issuer that systematically perturbs the unrolling of a streaming session can be temporarily or permanently revoked.

According to a particular embodiment of the invention, a received command is not transmitted to the trick mode controller when the received command is of a same determined type as an already transmitted command. For example, if a received command is of the determined type "play" and a "play" command was already transmitted, the received play command is not transmitted, but a received command of determined type "fast forward" is transmitted if it is not subject to be eliminated by other conditions for not transmitting a received command such as not respecting the first delay. This feature has the advantage to "filter" received commands for transmission, so that a trick mode controller will not receive meaningless "double" commands (play followed by another play), and will receive double commands that have a meaning, such as the described fast forward followed by another fast forward, which allows a digital content streamer to change fast forward speed like ×2, ×4, ×16.

According to a particular embodiment of the invention, the determined delay described above is determined according to an estimation of a delay needed to allow all of several command issuers to render a result of the second command. This feature allows giving all issuers time to render the result of a command before a new command is taken into account, and makes it easier to follow a streaming session for all issuers.

Figure 2:
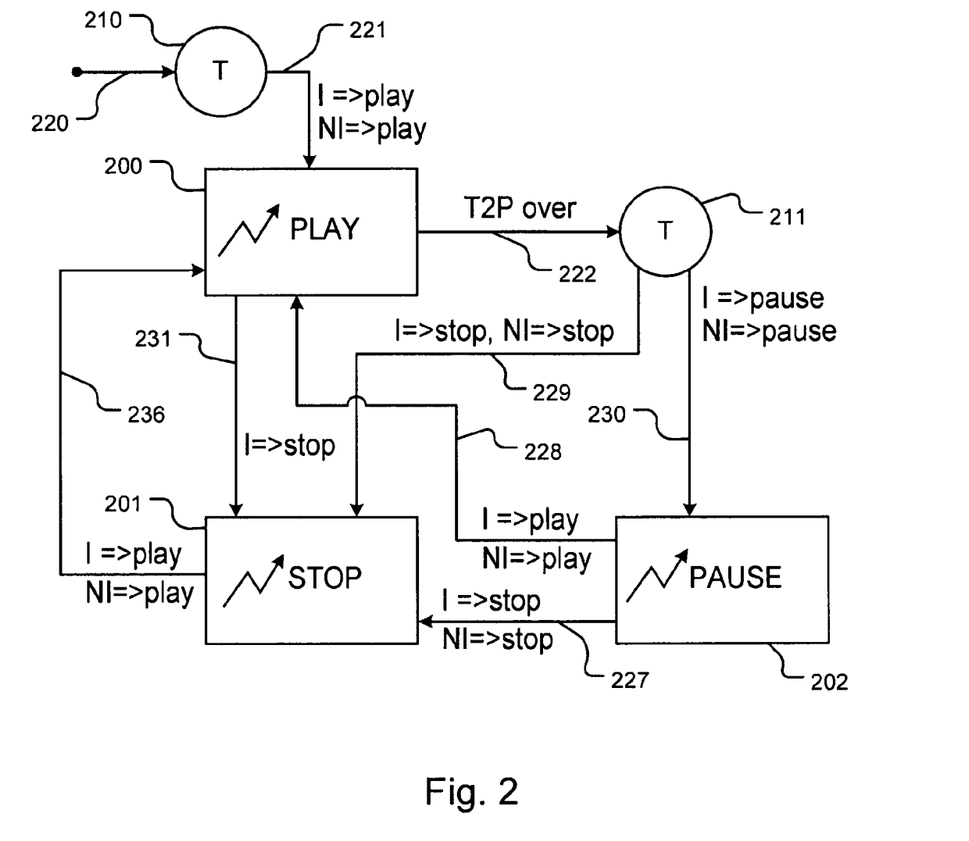
FIGS. 2 and 3 illustrate an implementation of the method according to the invention in the form of a state machine. The state machine can for example be implemented in trick mode manager 120 of FIG. 1.

FIG. 2 illustrates in a first embodiment an implementation of the method according to the invention in the form of a state machine. The state machine can for example be implemented in trick mode manager 120 of FIG. 1.

The state machine has three states "play" 200, "stop" 201 and "pause" 202, as well as two transition states "T" 210 and 211.

Transition state 210 is connected to state "play" 200 via connection 221.

Transition state 211 is connected to state "play" 200 via connection 222, and to state "pause" 202 via connection 230 and to state "stop" 200 via connection 229.

State "play" 200 is further connected to state "stop" 201 via connection 231.

State "pause" 202 is connected to state "stop" 201 via connection 227, to state "play" 200 via connection 228.

State "stop" 201 is connected to state "play" via connection 236.

The indications "I=>play" and "NI=>play" mean: initiator sends a trick mode command "play", respectively non-initiator sends a trick mode command "play". The initiator and non-initiator are examples of issuers; in this example, the initiator, being from example the initiator of a streaming session, has highest issuer rights.

The state machine of FIG. 2 starts with a power up from connection 220 and enters transition state 210, where it waits for a trick mode command from a command issuer.

The state machine enters the play state 200 upon reception of a trick mode command "play" from a command issuer. Upon entering this state, a trick mode command "play" is transmitted to the trick mode controller 100 of FIG. 1.

State "play" can be left via two means: either command "stop" is received from command issuer "initiator", upon which state "stop" is entered; or a determined first delay is elapsed until the transmission of the last transmitted command (here: "play"). In the first case, state "stop" 201 is entered and a "stop" trick mode command is sent to trick mode controller 100. In the second case, transition state 211 is entered.

Transition state 211 is left by two possible means: either the initiator or the non-initiator sends a "stop" trick mode command, upon state "stop" 201 is entered, or the initiator or the non-initiator sends a "pause" trick mode command, upon which the "pause" state 202 is entered. When state "stop" 201 is entered, a "stop" trick mode command is transmitted to trick mode controller 100. When state "pause" 202 is entered, a "pause" trick mode command is transmitted to trick mode controller 100.

State "pause" 202 can be left by two possible means: either the Initiator or the Non-Initiator send either a "play" or a "stop" trick mode command. If a "play" trick mode command is sent, the "play" state 200 is entered and a "play" trick mode command is transmitted to trick mode controller 100. If a "stop" trick mode command is sent, the "stop" state 201 is entered and a "stop" trick mode command is transmitted to trick mode controller 100.

State "stop" 201 can be left by one possible means: either the Initiator or the Non-initiator sends a "play" trick mode command, upon which "play" state 200 is entered and a "play" trick mode command is sent to trick mode controller 100.

The FIG. 2 shows that the initiator has more rights than the non initiator. In particular, the initiator can leave the "play" state 200 to go directly to the "stop" state 201. The figure also illustrates that after having entered the "play" state 200, no received command is transmitted, except for a stop command if the issuer has highest issuer rights, until a determined delay has elapsed since the transmission of the last command (here: play). This determined delay is elapsed in transition state 211.

According to a variant embodiment, trick mode command "play" from a non-initiator is ignored when in transition state 210, when in state "pause" 202, and when in state "stop" 201. This allows an initiator to keep better control over the streaming session, because non-initiators are allowed to stop and pause the stream, but are never allowed to play the stream, which is the privilege right of issuer "initiator".

Figure 3:
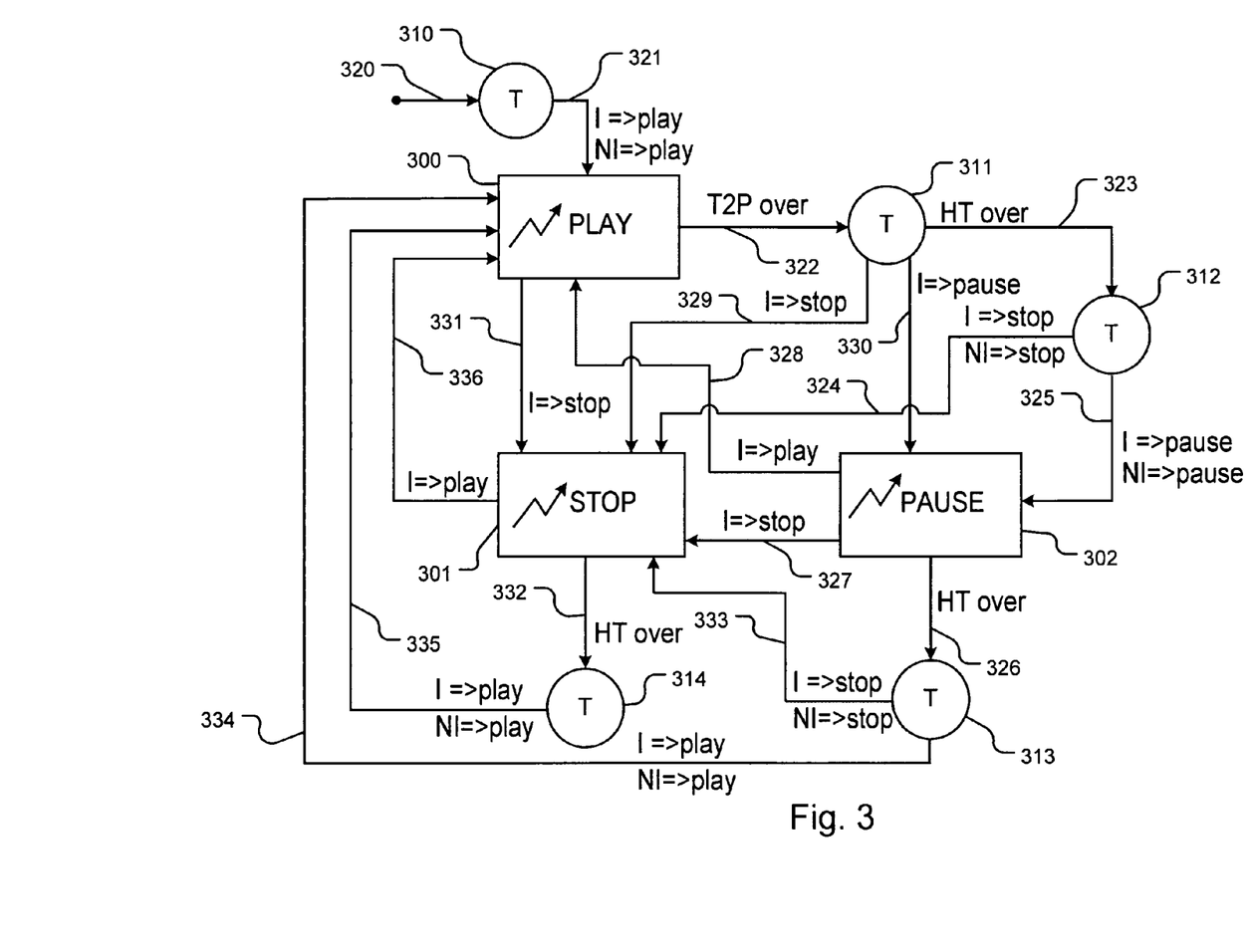

FIG. 3 illustrates in a second embodiment an implementation of the method according to the invention in the form of a state machine. In contrast to the embodiment of FIG. 2, the state machine of FIG. 3 comprises 3 more transition states, and furthermore only the Initiator is allowed to directly make the state machine change state. Non-initiators have to respect the three additionally transition states before being allowed to make the state machine change state.

The state machine has three states "play" 300, "stop" 301 and "pause" 302, as well as five transition states "T" 310, 311, 312, 313 and 314.

Transition state 310 is connected to state "play" 300 via connection 321.

Transition state 311 is connected to state "play" 300 via connection 322, and to state "pause" 302 via connection 330, to state "stop" 301 via connection 329 and to transition state 312 via connection 323.

Transition state 312 is connected to state "pause" 302 via connection 325, and to state "stop" 301 via connection 324.

Transition state 313 is connected to state "stop" 200 via connection 333 and to state "play" via connection 334.

Transition state 314 is connected to state "play" 300 via connection 335.

State "play" 300 is further connected to state "stop" 301 via connection 331.

State "pause" 302 is connected to state "stop" 301 via connection 327, to state "play" 300 via connection 328 and to transition state 313 via connection 326.

State "stop" 301 is connected to state "play" via connection 336 and to transition state 314 via connection 332.

The state machine of FIG. 3 starts with a power up from connection 320 and enters transition state 310 where it waits for a trick mode command from a command issuer.

The state machine enters the play state 300 upon reception of a trick mode command "play" from a command issuer, i.e. Initiator or Non-Initiator. Upon entering this state, a trick mode command "play" is transmitted to the trick mode controller 100 of FIG. 1.

State "play" can be left via two ways: either command "stop" is received from command issuer "Initiator", upon which state "stop" is entered, via connection 331; or a determined delay is elapsed until the transmission of the last transmitted command (here: "play") via connection 322. In the first case, state "stop" 301 is entered and a "stop" trick mode command is sent to trick mode controller 100. In the second case, transition state 311 is entered.

Transition state 311 is left by three possible ways: the initiator sends a "stop" trick mode command, upon which state "stop" 301 is entered, or the initiator sends a "pause" trick mode command, upon which the "pause" state 302 is entered, or a determined second delay is elapsed since the transmission of the last transmitted command to the trick mode controller 100. If the determined second delay is elapsed, transition state 312 is entered.

Transition state 312 is left by two possible ways: the initiator or the non-initiator either sends a "stop" or a "pause" trick mode command. When state "stop" 301 is entered, a "stop" trick mode command is transmitted to trick mode controller 100. When state "pause" 302 is entered, a "pause" trick mode command is transmitted to trick mode controller 100.

State "pause" 302 can be left by three possible ways: the initiator sends either a "play" or a "stop" trick mode command, or a determined second delay is elapsed since the transmission of the last transmitted command to the trick mode controller 100. If a "play" trick mode command is sent, the "play" state 300 is entered and a "play" trick mode command is transmitted to trick mode controller 100. If a "stop" trick mode command is sent, the "stop" state 301 is entered and a "stop" trick mode command is transmitted to trick mode controller 100. If a determined second delay is elapsed, transition state 313 is entered.

Transition state 313 can be left by two possible ways: either the initiator or the non-initiator sends a "stop" or a "play" trick mode command. If a "stop" trick mode command is sent, the "stop" state 301 is entered and a "stop" trick mode command is transmitted to trick mode controller 100. If a "play" trick mode command is sent, the "play" state 300 is entered and a "play" trick mode command is transmitted to trick mode controller 100.

State "stop" 201 can be left by two possible ways: either the initiator sends a "play" trick mode command, upon which "play" state 300 is entered and a "play" trick mode command is sent to trick mode controller 100, or a determined second delay is elapsed since the transmission of the last transmitted command to the trick mode controller 100. If a determined second delay is elapsed, transition state 314 is entered.

Transition state 314 is left by one possible ways: either the initiator or the non-initiator sends a "play" trick mode command. If a "play" trick mode command is sent, the "play" state 300 is entered and a "play" trick mode command is transmitted to trick mode controller 100.

The FIG. 3 also illustrates that a received trick mode command is not transmitted when a determined second delay is not respected between the transmission of a last transmitted command received from a first command issuer, and the reception of a second command from a second distinct command issuer, and the second command issuer does not have highest issuer rights allowing the second command issuer to derogate from respecting of the determined second delay. For example, after the initiator having issued a "play" command, the state machine enters transmission state 311. Then, only when the second delay is elapsed, the state machine enters transmission state 312; from this state, a "pause" command or a "stop" command from a non-initiator command issuer will make the state machine change state to the corresponding state; from the transmission state 311, when the second delay is not elapsed yet, only the initiator, having the highest issuer rights, can make the state machine change state.

According to a particular embodiment of the invention, the second delay is a minimal delay counted from the transmission time of a command to the trick mode controller 100 before a trick command from another command issuer is transmitted according to the conditions of transmission. This feature allows introducing a "hold delay" for trick mode command issuers, during which a trick mode command issuer has the control over the transmission of trick mode commands. The "hold delay" avoids quick changes between command issuers and thus protects the trick mode controller 100 of the reception of fast, possibly incoherent trick mode commands, which would be harmful to the good unrolling of a streaming session.

According to a particular embodiment of the invention, the digital content stream is an audio stream. The invention, applied in the context of audio streaming, allows sharing a same audio stream while supporting trick modes, for example for shared listening and intervening in the distribution of a recorded lecture.

According to a particular embodiment of the invention, the digital content stream is a video stream. The invention, applied in the context of video streaming, allows sharing a same video stream, for example for e-learning or for Video-on-Demand, while supporting trick modes.

Figure 4:
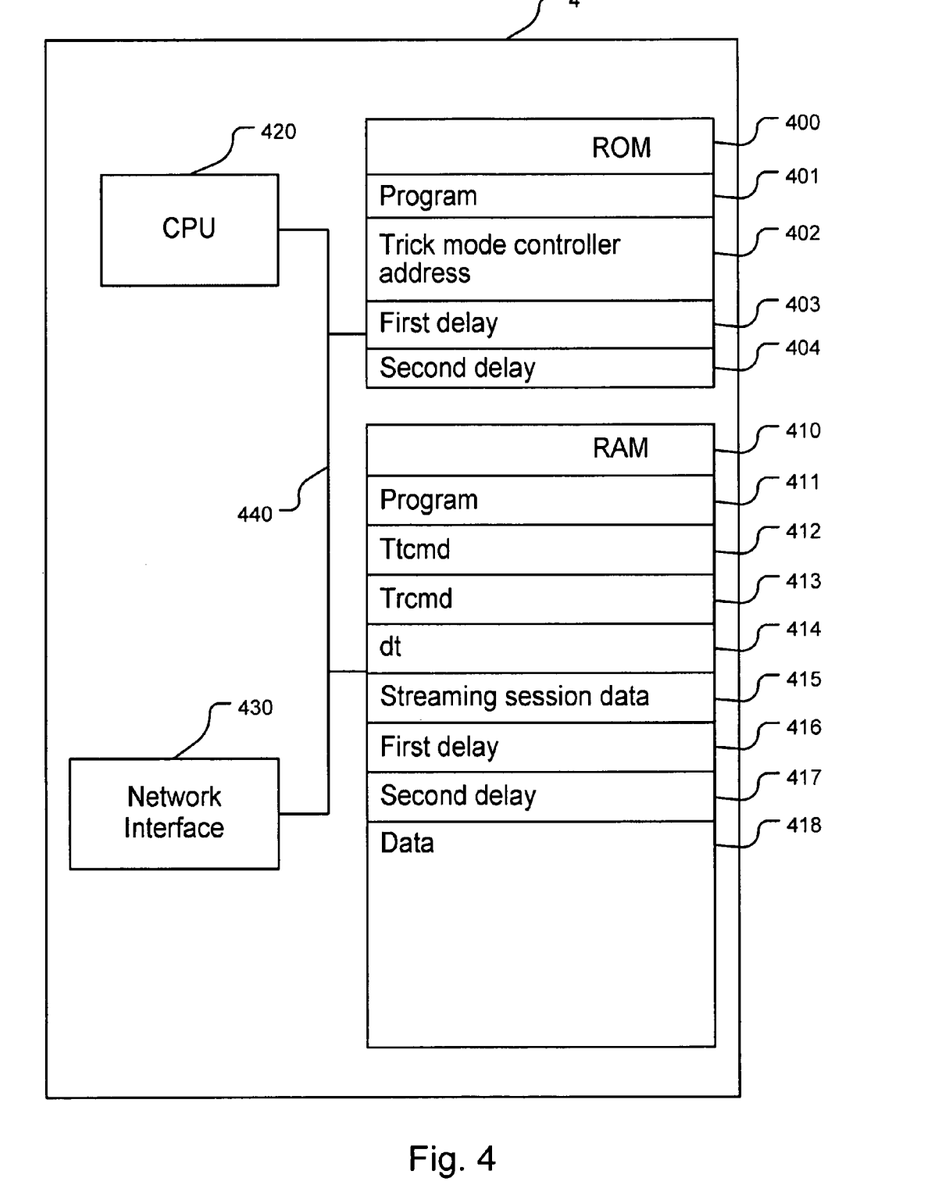
FIG. 4 shows a particular embodiment of an apparatus according to the invention implemented by a trick mode manager such as trick mode manager 120 of FIG. 1.

FIG. 4 illustrates a trick mode manager according a particular embodiment of the invention. The trick mode manager corresponds for example to trick mode manager 120 of FIG. 1. The trick mode manager 4 comprises the following elements, interconnected by an address and data bus 440:

- a non-volatile memory of type ROM (<<Read Only Memory>>) 400;
- a read-write memory or RAM (<<Random Access Memory>>) 410;
- a microprocessor 420 (or CPU, for <<Central Processing Unit>>); and
- a network interface 430;

At power-on, the microprocessor 420 copies a program comprising the instructions of the algorithm implementing the steps of the method of trick mode commands destined to control a digital content streaming server, that is stored in the ROM 400 to RAM register 410 and executes them.

The network interface 430 allows the server to receive and send messages and data over a network connection, like reception of trick mode commands from receivers A 140 and B 150 from FIG. 1, and transmission of trick mode commands to trick mode controller 100 of FIG. 1.

The word <<register>> used in the description of memories 400 and 410 means a low-capacity memory zone (only some binary data) or a high-capacity memory zone (allowing the storage of an entire program or of a large amount of data).

Each of the registers in ROM 400 and RAM 410 can hold a variable number of data of variable size. The read-only memory 400 comprises:

a register 401, where the program is stored;
a register 402, in which a trick mode controller device address is stored;
a register 403, in which a value for the determined first delay is stored; and
a register 404, in which a value for the determined second delay is stored.

The random-access memory 410 comprises:
a register 411, used for storing the program that it is copied from ROM register 401;
a register 412, used for storing Ttcmd, a time of transmission of the last transmitted trick mode command;
a register 413, used for storing Trcmd, a time of reception of a trick mode command;
a register 414, used for storing dt, being an elapsed time between Ttcmd and Trcmd;
a register 415, used for storing streaming session data, such as identification of issuers and issuer command rights;
a register 416, used for storing a current value of the first delay, copied from ROM register 403 at power up, possibly modified during functioning of the trick mode manager and recopied to ROM register 403 before power down;
a register 417, used for storing a current value of the second delay, copied from ROM register 404 at power up, possibly modified during functioning of the trick mode manager and recopied to ROM register 404 before power down; and
a register 418 that contains data needed for the functioning of the program stored in RAM register 411, such as temporary variables and data tables.

FIG. 5 shows an algorithm of implementing the steps of the method of trick mode commands destined to control a digital content streaming server according to a particular embodiment of the invention, such as implemented by trick mode manager 4 of FIG. 4.

The CPU 420 loads the program containing the algorithm from ROM memory 400 to RAM memory 410 and starts the program. The algorithm starts with initialization step 500, where all variables needed for the algorithm are initialized.

In step 501, at least one trick mode command from at least one command issuer is received.

In step 502, determination is done of dt, the elapsed time between said received command Trcmd and a last transmitted command Ttcmd.

In tests 503 and 504, it is determined if the received command can be transmitted according to determined conditions.

In test 503 it is determined if the elapsed time dt is smaller than a determined first delay. If this is false, the algorithm continues with step 505; if this is true, the algorithm continues with test 504.

In test 504, it is determined if the command issuer of the received command has highest issuer rights. If this is false, the algorithm reiterates with step 501; if this is true, the algorithm continues with step 505.

In step 505, the received command is transmitted.

Finally, the algorithm reiterates with step 501.

The reader of the present document will understand that the described embodiments are given as example embodiments of the invention, and thereby the invention is not limited to these embodiments.

In particular, the described determined conditions for not transmitting a received command can be combined.

In particular, the reader of the current document will understand that the illustrations are limited for illustrative and explanative reasons; notably, the invention is also suited to take into account other types of trick mode commands than illustrated such as fast forward, fast reverse, image by image stepping in reverse and forward direction, and go to a specific position.

In particular, the reader will understand that the application of the invention is not limited to two receivers, and can apply to three, four or more receivers.

In particular, the reader will understand that the application of the invention is not limited one digital content streaming server, and can apply to three, four or more digital content streaming servers.

In particular, the invention does not necessarily be implemented with a state machine, but can also be implemented with for example with a device exploiting a database containing rules for transmission of received trick mode commands.

The infrastructure of FIG. 1 is illustrated as an example embodiment. Other infrastructures are possible that are compatible with the invention, with additional or less devices; according to a particular embodiment of the invention, an operator network hosts the trick mode manager, the trick mode controller and the digital content streamer, as well as other devices needed for its functioning: transmitter equipment, traffic management, scrambling management equipment. In a particular embodiment of the invention, additional network equipment is needed comprising network switches and routers. According to a particular embodiment of the invention, a DSLAM (Digital Subscriber Line Access Multiplexer) is present on an access network that connects receivers to the operator network that comprises the trick mode manager and the digital content streamer, and the receivers are equipped with an ADSL (Asynchronous Digital Subscriber Line) type modem, either external or internal, to connect to the access network. According to a particular embodiment of the invention, different receivers access a same trick mode manager via different access networks. According to a particular embodiment of the invention, a receiver can be of a dedicated type, comprising an STB (Set Top Box) or a more generic type comprising a PC (Personal Computer). According to a particular embodiment of the invention, a receiver is connected to the access network by means of a gateway, and other receivers are connected to the gateway in what is commonly called a home network. For example, trick mode management may be implemented in a complex environment where additional features are necessary to provide content access rights control, or management of the streams.

The described embodiment of the trick mode manager is an example of a possible implementation of the invention. Other implementations that are compatible with the invention are possible. The trick mode manager can for example also be combined with the trick mode controller and the digital content streamer. According to a particular embodiment of the invention, the network formed by receivers according to the invention is a peer-to-peer network. Then, even the trick mode manager can be hosted by one of the peers, for example the peer that initiates a content streaming session. The digital content streamer can, using the peer-to-peer distribution model, source the digital content to be streamed over the peer-to-peer network. The application of the invention to a peer-to-peer network has the advantages that a distributed content distribution model has over a centralized content distribution model, such as reducing the need for centralized resources.

According to a particular embodiment of the invention, the messages exchanged over the connections from the receivers to the trick mode manager comply with the RTSP protocol (Real Time Streaming Protocol, RFC 2326).

According to a particular embodiment of the invention, at least one of the receivers is a wireless receiver, for example a cellular telephone with streamed digital content rendering capacity. A combination of wireless and wired receivers is perfectly possible with the invention, as long as all receivers implement the method of the invention.

According to a particular embodiment of the invention, the invention is applied in the context of operator managed networks such as described by the IMS based NGN specifications in 3GPP and in TISPAN standard (IMS stands for IP Multimedia Subsystem, an architectural framework for delivering internet protocol (IP) multimedia to mobile users and Telecoms & Internet converged Services & Protocols for Advanced Networks (TISPAN), a standardization body of ETSI; NGN stands for Next Generation Networking, a broad term to describe some key architectural evolutions in telecommunication core and access networks that is expected to be deployed over years 2013-2019; 3GPP stands for $3^{rd}$ Generation Partnership Project, a collaboration between groups of telecommunications associations). Then, the trick mode manager is hosted by a provider. In the context of IMS, this can for example be in the form of one or more IMS MRF (Media Resource Function) functional entities. An MRF comprises a Media Resource Function Controller (MRFC) for processing the signaling and a Media resource Processor (MRFP) for processing the media transport. In the context of TISPAN and IPTV services that includes Content on Demand services, this can for example be in the form of similar entities as for IMS, here named IPTV Media functions that comprise an IPTV Media Control Function and one or more Media Delivery Function entities. In the above context of IMS/TISPAN, the provider initiates a content streaming session and invites invitees, for example some friends, to enter the content streaming session. Using the invention, all invitees share the same content, and they can additionally issue trick mode commands, of which the results are shared over all receivers.

According to a particular embodiment, the invention is applied in the context of non-operator managed networks such as the internet.

According to a particular embodiment of the invention, a user interface is distributed to the receivers, that provides a screen area where the content stream is displayed as well as a screen area where trick mode command buttons are displayed, that give the user access to the sending of trick mode commands.

The invention claimed is:

1. A method of managing trick mode commands, wherein said trick mode commands are destined to control a streaming of a same digital content stream by a digital content streaming server to at least two digital content stream receivers as a function of a received trick mode command, the method comprising:
   receiving, from one of said at least two digital content stream receivers that share reception of said same digital content stream streamed by said digital content streaming server, a trick mode command, that controls the streaming by the digital content streaming server to said at least two digital content stream receivers, called received trick mode command;
   determining elapsed time between said received trick mode command and a last transmitted trick mode command transmitted to said digital content streaming server;
   transmitting said received trick mode command to said digital content streaming server if none of determined conditions applies, said determined conditions comprising:
      said elapsed time is smaller than a determined first delay; and
      a trick mode command issuer of said received trick mode command does not have highest issuer rights allowing said trick mode command issuer to derogate from respecting of said determined first delay.

2. The method according to claim 1, further comprising determining said first delay according to an estimation of a delay needed to allow all of said at least two digital content stream receivers to render a result of said trick mode command.

3. The method according to claim 1, wherein said determined conditions further comprises:
   a determined second delay is not respected between the transmission of a last transmitted trick mode command received from a first trick mode command issuer, and the reception of a second command from a second distinct trick mode command issuer, and
   said second trick mode command issuer does not have highest issuer rights allowing said second trick mode command issuer to derogate from respecting of said determined second delay.

4. The method according to claim 3, further comprising determining said second delay according to a minimal delay counted from the transmission time of a trick mode command before a trick mode command from another trick mode command issuer is transmitted if none of said determined conditions applies.

5. The method according to claim 1, further comprising attributing a highest level of issuer rights to a trick mode command issuer that initiated a streaming session.

6. The method according to claim 1, wherein said trick mode command issuer rights for transmission of said second trick mode command comprise a limitation on a type of trick mode commands that are transmitted to said digital content streaming server under respect of said determined conditions.

7. The method according to claim 1, wherein said determined conditions further comprises:
   said received trick mode command is of a same determined type as an already transmitted trick mode command.

8. The method according to claim 1, wherein said digital content stream is an audio stream.

9. The method according to claim 1, wherein said digital content stream is a video stream.

10. A device for management of trick mode commands, wherein said trick mode commands are destined to control a streaming of a same digital content stream by a digital content streaming server to at least two digital content stream receivers as a function of a received trick mode command, the device comprising:
    a network interface configured to receive, from one of said at least two digital content stream receivers that share reception of said same digital content stream streamed by said digital content streaming server, a trick mode command that controls the streaming by the digital content streaming server to said at least two digital content stream receivers, called received trick mode command;
    a processor configured to determine elapsed time between said received trick mode command and a last transmitted trick mode command transmitted to said digital content streaming server;
    a network interface configured to transmit said received trick mode command to said digital content streaming server if none of determined conditions applies, said determined conditions comprising:
       said elapsed time is smaller than a determined first delay; and
       a trick mode command issuer of said received trick mode command does not have highest issuer rights allowing said trick mode command issuer to derogate from respecting of said determined first delay.

11. The device according to claim 10, wherein said first delay is determined according to an estimation of a delay needed to allow all of said at least two digital content stream receivers to render a result of said trick mode command.

12. The device according to claim 10, wherein said determined conditions further comprise:
   a determined second delay is not respected between the transmission of a last transmitted trick mode command received from a first trick mode command issuer, and the reception of a second command from a second distinct command issuer, and
   said second trick mode command issuer does not have highest issuer rights allowing said second trick mode command issuer to derogate from respecting of said determined second delay.

13. The device according to claim 12, wherein said second delay is determined according to a minimal delay counted from the transmission time of a trick mode command before a trick mode command from another trick mode command issuer is transmitted if none of said determined conditions applies.

14. The device according to claim 10, further comprising a highest level of issuer rights that is attributed to a trick mode command issuer that initiated a streaming session.

15. The device according to claim 10, wherein said trick mode command issuer rights for transmission of said second trick mode command comprise a limitation on a type of trick mode commands that are transmitted to said digital content streaming server under respect of said determined conditions.

16. The device according to claim 10, wherein said determined conditions further comprise:
   said received trick mode command is of a same determined type as an already transmitted trick mode command.

17. The device according to claim 10, wherein said digital content stream is an audio stream.

18. The device according to claim 10, wherein said digital content stream is a video stream.

* * * * *